United States Patent
Matthews

(10) Patent No.: US 7,257,251 B2
(45) Date of Patent: Aug. 14, 2007

(54) CHROMINANCE SMOOTHING

(75) Inventor: Kristine E. Matthews, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 795 days.

(21) Appl. No.: 10/650,518

(22) Filed: Aug. 28, 2003

(65) Prior Publication Data

US 2005/0047653 A1   Mar. 3, 2005

(51) Int. Cl.
*G06K 9/00*   (2006.01)

(52) U.S. Cl. ............... 382/167; 382/162; 382/165; 382/166; 382/274; 358/518; 345/593; 345/600

(58) Field of Classification Search ........... 382/167, 382/162, 165, 166, 168, 169, 172, 274; 358/518–523; 348/453; 345/589, 590, 591, 593, 600, 601
See application file for complete search history.

(56) References Cited

U.S. PATENT DOCUMENTS

| 5,130,786 | A | 7/1992 | Murata et al. |
|---|---|---|---|
| 5,570,131 | A | 10/1996 | Pires |
| 5,629,780 | A | 5/1997 | Watson |
| 6,016,200 | A | 1/2000 | Sjostrand |
| 6,204,939 | B1 * | 3/2001 | Lin et al. .................. 358/518 |
| 6,330,076 | B1 * | 12/2001 | Imaizumi et al. ........... 358/1.9 |
| 2002/0196350 | A1 * | 12/2002 | Cooper .................. 348/223.1 |
| 2004/0001184 | A1 * | 1/2004 | Gibbons et al. ............. 353/31 |
| 2004/0001610 | A1 * | 1/2004 | Murakami ................. 382/100 |
| 2006/0001660 | A1 * | 1/2006 | Plut ........................ 345/211 |

OTHER PUBLICATIONS

A.M. Tekalp, Digital Video Processing, Upper Saddle River, N.J.: Prentice Hall PTR, 1995, pp. 396.
R. Aravind, G.L. Cash, D.L. Duttweiler, H-M. Hand, B.G. Haskell, and A Puri, "Image and Video Coding Standards," AT&T Technical Journal, Jan./Feb. 1993, pp. 67-89.
A.K. Jain, Fundamentals of Digital Image Processing, Englewood Cliffs, NJ: Prentice Hall, 1989.

* cited by examiner

*Primary Examiner*—Matthew C. Bella
*Assistant Examiner*—Ali Bayat
(74) *Attorney, Agent, or Firm*—Jon M. Dickinson, PC; Robert D. Varitz, PC

(57) ABSTRACT

A method for reducing chrominance entropy in a digital color image. This method is practiced in relation to pixels in the two chrominance channels in a luminance-chrominance-chrominance representation of the image. The method involves shifting the chrominance values of selected low-luminance or high-luminance pixels toward (or to) another chrominance value which will result in a net chrominance entropy reduction in the subject channel.

9 Claims, 1 Drawing Sheet

CHROMINANCE SMOOTHING

BACKGROUND AND SUMMARY OF THE INVENTION

This invention, referred to herein as chrominance smoothing, relates to a method for reducing the entropy in a luminance-chrominance-chrominance (L,C,C) color-space representation of a digital color image, with a resulting (after reduction) minimal degradation occurring in visually perceived image quality. Practice of the invention which, as will be explained, can be implemented in a number of different specific ways, takes special advantage of the human visual system's relatively low sensitivity to chrominance differentiation between adjacent image pixels at and near the extremes (the black or white regions in an image) of luminance values. A preferred manner of implementing and practicing the invention focuses attention on the low-luminance extreme—namely, the ("black" and near-black) regions in an image.

As is well known in the relevant art, manipulation and handling of color digital imagery to achieve a practical balance between retained, high image quality and desired, reduced data-handling file size, bit rate and bandwidth, is a heavily attended area of technical attention and development. For example (just one among many possible examples), color imagery, both still and motion, is typically acquired in colorimetric R,G,B (red, green and blue) color space in which the color of a pixel is described by values assigned to these three (R, G, B), components. Image-data management in the form of image compression often, with regard to such an acquired category of color imagery, begins with a color-space conversion to create an appropriate luminance-chrominance-chrominance (L,C,C) color-space (channel) representation, such as Y,u,v Y,Cb,Cr, or L*, a*, b*—a representation in which the low human visual sensitivity to high-frequency chrominance information is exploited. This conversion, which provides an opportunity for chrominance sub-sampling, thus promotes the opportunity for significant reduction in data-handling factors, such as bit rate and bandwidth. Such a conversion is accomplished fundamentally by reducing the resolution of the chrominance images—u and v in Y,u,v, Cb and Cr in Y,Cb,Cr, and a* and b* in L*, a*, b*.

The present invention springs from this kind of L,C,C conversion and data-handling improvement, and further significantly advances this area of improvement by recognizing, and taking advantage of, the fact, mentioned briefly earlier, that the human visual system's sensitivity to chrominance differentiation at and near the extremes of luminance is quite low. The basic approach proposed by the methodology of the invention is to capitalize on this diminished sensitivity by smoothing, or evenizing, and greatly minimizing chrominance pixel-edge differentiation, thus to create an appreciable reduction in chrominance-channel entropy, and to improve compression of the chrominance channels. Thus, the method proposed by the invention uses the fact that, at the extreme luminance values (black or white regions) of an image, the chrominance information is less significant to perception. As will be seen, this method may be used in conjunction with chrominance sub-sampling to enable further image compression.

While a number of specific and useful entropy-reduction approaches, well within the scope of this invention, can be employed to implement the practice of the invention, only several of these are specifically illustrated and/or described herein to demonstrate the special utility of this invention.

Further, while practice of the invention can produce significant chrominance entropy reduction at or near either one of the two luminance extremes, I have found that a preferred approach involves applying the invention at or near a luminosity region associated with the low (black-end) luminance extreme. Regions of an image containing pixels with low luminance values are typically text regions, often black text on a colored or textured background. As such, both the luminance and chrominance channels of the related image contain edges which may be "smoothed", and it is such smoothing which this invention addresses.

These and other objects and advantages which are attained by the present invention will become more fully apparent as the description which now follows is read in conjunction with the accompanying drawings.

DETAILED DESCRIPTION OF THE INVENTION

Figure 1:
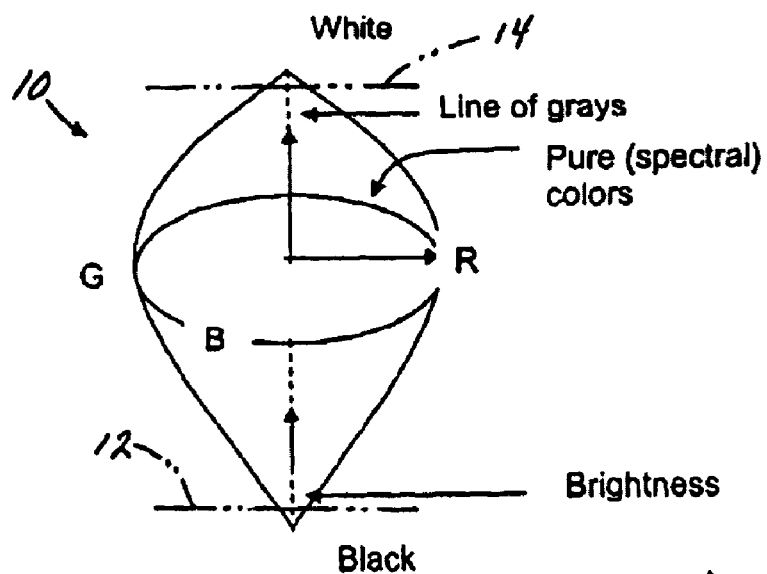
FIG. 1 is a rendition of a traditionally presented diagram which provides, graphically, a representation regarding human perception of color space where brightness effectively represents perceived luminance.

Turning now to the drawings, and referring first of all to FIG. 1, here there is shown generally at 10 a familiar representation of human-vision perception of color space. What is clearly shown in this figure is the fact that at and near the luminance extremes, the upper and lower ends of the illustration in FIG. 1, the human perception sensitivity to chrominance differentiation is relatively insignificant. As was mentioned earlier herein, the present invention takes advantage of this low chrominance sensitivity, and proposes what will now be described as a method for the reduction of chrominance entropy in digital color image regions possessing pixels whose luminance values lie either at, or within a close value "distance" to, either of these extremes.

Dash-double-dot lines 12, 14 in FIG. 1 represent threshold values of luminance which are near, respectively, the low-luminance end and the high-luminance end of the full range of luminosity illustrated in FIG. 1. These two lines can be thought of as representing threshold values which are useful to the practice of the present invention, and which define two, near-to-extremes boundaries of two ranges of luminosity values that lie next-adjacent the two illustrated luminosity extremes. Expressed in another manner, these threshold values define a range of luminosity values which, if found to be characteristic of certain pixels in a digital color image which is to be treated by application of the present invention, may conveniently and usefully be selected to mark such pixels for the specific application of the entropy-reduction practice of the present invention.

Figure 2:
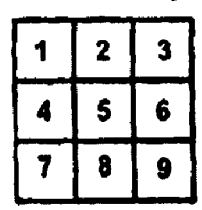
FIGS. 2(a) and 2(b) present, respectively, a pixel numbering diagram of a 9-pixel square region of a digital color image, and an R,G,B representation of this image region.
Figure 2:
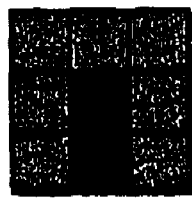

Turning attention now to FIGS. 2(a) and 2(b), shown at 16 in these two figures is a 9-pixel square region of a digital color image, wherein the nine illustrated pixels, as shown in FIG. 2(a), are selectively and individually numbered 1-9, inclusive. FIG. 2(b) illustrates this very same image region in a manner whereby one can see that pixels numbers 1, 2, 3, 4, 6, 7 and 9 are distinctly different in appearance in comparison to pixels 5 and 8. For the purpose of illustration herein, it will be assumed that pixels 1, 2, 3, 4, 6, 7 and 9 have a certain, same color (pictured as a gray-scale color in FIG. 2(b)) which is characterized with luminance values that lie within the threshold lines shown at 12, 14 in FIG. 1, and that pixels 5 and 8 are black, and thus are characterized with luminance values which lie at the low end of the luminance range. Printed text provides a good illustration of an image possessing such low-luminosity pixels.

Figure 3:
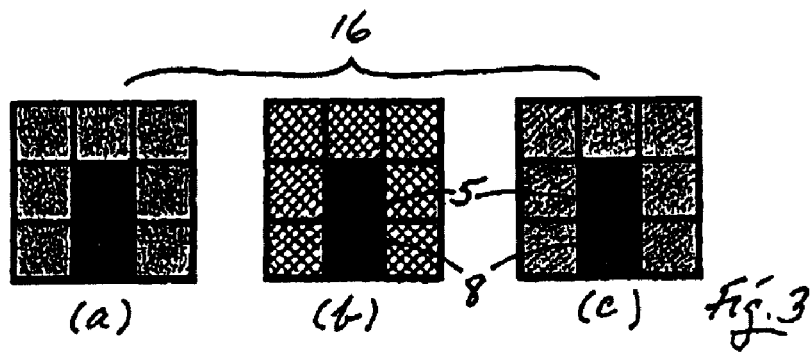
FIGS. 3(a), 3(b) and 3(c) present, respectively, the luminance channel and the two chrominance channels of an L,C,C conversion which has been performed on the R,G,B color image of FIG. 2(b).

Considering now FIGS. 3(a), 3(b), 3(c) along with FIGS. 2(a) and 2(b), FIGS. 3(a), 3(b), 3(c) furnish another representation of image 16 as such is shown in FIG. 2(b), and specifically show, respectively, the pixel characteristics of this image in the luminance channel, and in the two chrominance channels. This representation illustrates the result of a luminance-chrominance-chrominance conversion of the image in FIG. 2(b). FIG. 3(a) represents the luminance channel, and FIGS. 3(b) and 3(c) represent the chrominance channels. Pixels 1, 2, 3, 4, 6, 7 and 9 correspond to an RGB triplet ($r_b$, $g_b$, $b_b$). Pixels 5 and 8 correspond to the triplet (0, 0, 0). In the L*a*b* color space, these triplets are expressed as ($L^*_b$, $a^*_b$, $b^*_b$) and (0, 0, 0), respectively. One should note that the values in L*a*b* may be mapped to a number of eight-bit representations, such as, CIELAB, ICCLAB, or ITULAB.

According to practice of the present invention, the chrominance values, both 0, of pixels 5 and 8 may be changed to yield much smoother chrominance images without adversely affecting overall image quality. Such a change will reduce the entropy of the chrominance channels, and thus yield increased compression performance. In fact, experimental results indicate that replacing these chrominance values with those, for example, of the background, $a^*_b$ and $b^*_b$ will result in a modified image that is visually equivalent to the original image, but characterized with bit-rate savings of about 5% to about 30% for images that contain predominantly dark colored text on a colored (flat or textured) background.

Thus, according to practice of the present invention, by making a certain kind of value change in the two chrominance channels of image 16 so as to alter specifically the chrominance values of pixels 5 and 8, it is possible to reduce significantly the chrominance channel entropy of image 16 without, ultimately, degrading the human perception of such a modified image.

Figure 4:
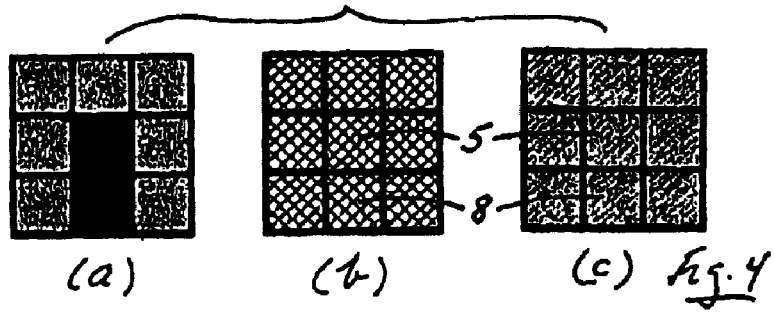
FIGS. 4(a), 4(b) and 4(c), are, respectively, revised presentations of the luminance channel and the two chrominance channels of this very same image (2(b)) after application of the process of the present invention to smooth and reduce the entropies of the two chrominance channels as originally pictured specifically in FIGS. 3(b) and 3(c).

FIGS. 4(a), 4(b) and 4(c) illustrate the luminance and chrominance channels of image 16 after application of the basic method of the present invention to change the chrominance-channel values of pixels 5 and 8 in the two associated chrominance channels. What is clearly illustrated in FIGS. 4(b) and 4(c) is that image smoothing, because of chrominance value-changing, has clearly taken place in the two chrominance channels, whereby pixels 5 and 8 in these two channels no longer stand out from the other pixels in these two channels.

In the specific application of the method of this invention to produce what is shown in FIGS. 4(b) and 4(c), as compared to what is shown in FIGS. 3(b) and 3(c), respectively, entropy reduction has taken place, on a channel-by-channel basis, by selecting in each channel the specific chrominance value of a neighboring pixel, such as that of pixel 1, and then replacing the chrominance values of pixels 5 and 8 in this channel with that same pixel-1 chrominance value.

The result of this change in chrominance values is that (1) the respective entropies of the two chrominance channels originally pictured in FIGS. 3(b) and 3(c) have been significantly reduced, (2) the chrominance characteristic of image 16 has been smoothed, and (3), because of the fact that this chrominance-value changing has taken place within the low-luminance threshold defined by line 12 in FIG. 1, the ultimately viewable color image which possesses this change will effectively look completely unchanged to normal human vision.

It will thus be apparent that practice of the present invention, as generally outlined above, yields a very effective change in chrominance entropy, and as a consequence, reduces bit-rate and bandwidth data-handling characteristics of image 16. While a specific illustration of application of the invention has thus been given in relation to borrowing, on a channel-by-channel basis, the chrominance value of a so-called "neighboring" pixel, other value-change approaches may be used just as well. Set forth immediately below is a list which contains verbal illustrations of other chrominance-value-change modalities with respect to pixels that have been selected for chrominance-value changing:

1. Shifting a selected pixel value toward that of another pixel value which has not been selected for change.

2. Replacing a selected pixel value by an average of the same chrominance-channel values of non-selected pixel neighbors.

3. Replacement of a selected chrominance value in a channel by an average of the same chrominance-channel values of pixels in a block which will be used in conjunction with the implementation of a compression algorithm.

4. Changing of a selected pixel's chrominance value in a channel by replacing that value with a value which makes the average chrominance value for an imagery block which is now being encoded the same as the average chrominance value of the pixels in the previously encoded block.

There are, of course, other illustrations which will come to the minds of those generally skilled in the relevant art.

Accordingly, those skilled in the art will recognize, from the description given above, that there are other useful approaches which may be practiced in accordance with the present invention to reduce chrominance entropy by an approach including per-channel, pixel-chrominance value-changing.

Among other things, it should now be understood that practice of the present invention may be implemented both with respect to still images and with respect to still-image frames that are present in a motion-image sequence. Also, while a specific application of the invention has been illustrated herein to take place at the low extreme of luminance, similar approaches may be taken with regard to changing pixel values at and near the high end of the luminance range.

Thus a preferred manner of practicing the invention, and several modified approaches, have been described herein, and a recognition has been given to the fact that other approaches may be engaged which will also come within the scope of the present invention.

I claim:

1. A method for chrominance smoothing a digital color image which is characterized by a luminance-chrominance-chrominance channel-color-space representation, said method comprising selecting an image region for smoothing attention,
within that region further selecting pixels therein which have a luminance value that is on one side, in value, of a defined luminance threshold value, and
changing the chrominance-channel values of such selected pixels so as to lower associated chrominance-channel entropy.

2. The method of claim 1, wherein, with respect to each such selected pixels, chrominance-value changing, with regard to each chrominance channel associated with that pixel, is performed by shifting the pixels' chrominance value in that channel toward the same-channel chrominance value of non-selected, immediate-neighbor pixel.

3. The method of claim 1, wherein, with respect to each such selected pixel, chrominance-value changing, with regard to each chrominance channel associated with that pixel, is performed by changing the selected pixels' chrominance value in that channel to be the same as that of a same chrominance-channel value of any non-selected neighboring pixel.

4. The method of claim 1, wherein, with respect to each such selected pixel, chrominance-value changing, with regard to each chrominance channel associated with that pixel, is performed by replacing the chrominance value of that pixel in that channel by an average of the same chrominance-channel values of non-selected pixel neighbors.

5. The method of claim 1, wherein, with respect to each such selected pixel, chrominance-value changing, with regard to each chrominance channel associated with the pixel, is performed by replacing the chrominance value in that channel by an average of the same chrominance-channel values of pixels in a block which will be used in conjunction with the implementation of a compression algorithm.

6. The method of claim 1, which is employed with respect to a block-based compression algorithm, and wherein, with respect to each such selected pixel, chrominance-value changing with regard to each chrominance channel associated with that pixel, is performed by replacing the pixel's chrominance value in that channel by that value which makes the average chrominance value for the encoding block which contains the selected pixel the same as the average chrominance value of the pixels in the previously encoded block.

7. The method of claim 1 which is performed in conjunction with an image which is selected from the group consisting of (a) a still, stand-alone image, and (b) a still-frame in a sequence of images which collectively makeup a moving image.

8. The method of claim 1, wherein the mentioned side of a defined luminance threshold value is toward the high side of that value.

9. The method of claim 1, wherein the mentioned side of a defined luminance threshold value is toward the low side of that value.

* * * * *